Dec. 31, 1940.    J. H. STORTZ    2,227,412
TRANSMISSION CONTROLLING MECHANISM
Filed Jan. 26, 1932
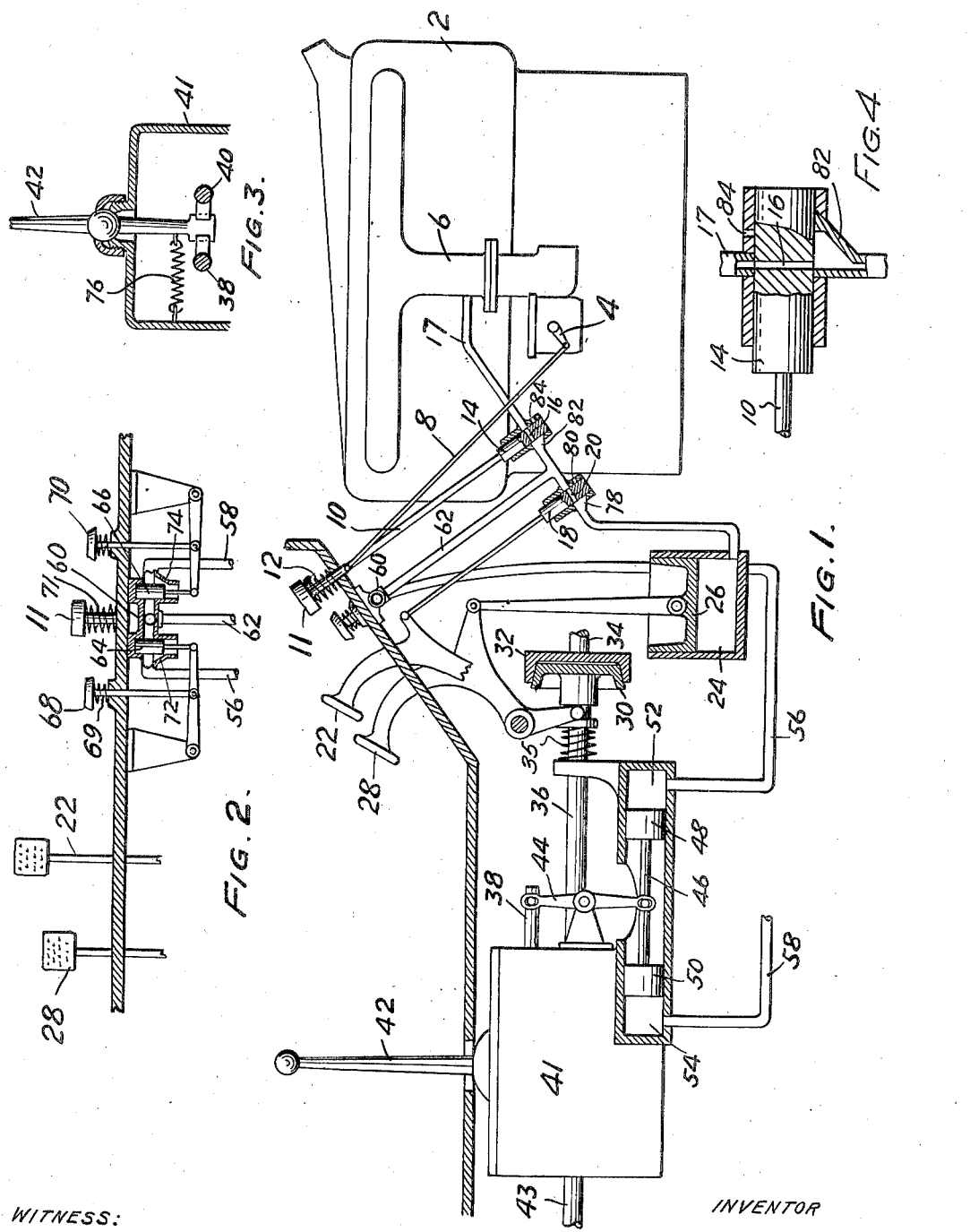
WITNESS:
INVENTOR
John H. Stortz
BY
Busser & Harding
ATTORNEYS.

Patented Dec. 31, 1940

2,227,412

UNITED STATES PATENT OFFICE 2,227,412

TRANSMISSION CONTROLLING MECHANISM

John H. Stortz, Philadelphia, Pa., assignor, by mesne assignments, to Bendix Aviation Corporation, South Bend, Ind., a corporation of Delaware Application January 26, 1932, Serial No. 588,885

6 Claims. (Cl. 192—3.5)

This invention relates to a transmission controlling mechanism particularly designed for semi-automatic control of the intermediate mechanism between an internal combustion engine of a motor vehicle and the driving wheels. More specifically, the invention relates to means for controlling the clutch and change speed gearing of such intermediate mechanism.

In order to cause an internal combustion engine to drive a vehicle in proper fashion under various conditions there is interposed between the engine and the drive wheels a clutch mechanism and a change speed gear mechanism. Until recently, it was customary in practical machines to disconnect the clutch by manipulation of a suitable pedal and then manually effect a change of gears to properly determine the ratio between the shafts of the engine and the rear wheels. It has now become customary to cause a disconnection of a clutch mechanism in some automatic fashion whenever the automobile is running under its own momentum so that while the automobile may be moving at a high speed, the engine may be idling.

It is a broad object of the present invention to provide an improved arrangement for controlling the engagement and disengagement of the clutch in the proper fashion to take care of various contingencies arising in operation.

A further object of the invention is the provision of means whereby change of gears may be effected at least in part in a semi-automatic fashion, the actual shift of the gears being effected by power means under the control, however, of relatively sensitive and ready manipulatable valves.

More specific objects of the invention relating particularly to details of invention and construction will become apparent from the following description read in conjunction with the accompanying drawing in which:

Fig. 1 is a diagrammatic view partly in section illustrating the train of mechanism involved between the internal combustion engine and the ultimate driven parts;

Fig. 2 is a transverse section showing certain controlling mechanism;

Fig. 3 is a transverse section through the change speed gearing looking forwardly; and Figure 4 is an enlarged sectional view of the accelerator operated valve disclosed in Figure 1.

The internal combustion engine of the automobile is indicated at 2 and involves a conventional carburetor, the flow of mixture from which is controlled by a suitable throttle valve whose control lever is indicated at 4, the mixture flowing from the carburetor through the valve and the intake manifold 6 to the various cylinders as determined by the timing of their individual valves. The throttle valve control lever 4 is connected by a link 8 to the accelerator plunger 10 provided with a button 11 or suitable lever for foot operation, the accelerator plunger 10 being normally held upwardly by a spring 12 to close the throttle valve to such position as will determine idling of the engine.

A piston 14 secured to the lower end of the plunger 10 moves in a suitable cylinder interposed in a vacuum line 17 connected with the intake manifold between the throttle valve and the cylinders. The piston 14 is provided with an opening 16 which, when the throttle is closed, furnishes communication between the portions of line 17 extending oppositely from the valve cylinder.

A second piston 18 also provided with a transverse passage 20 slides in a cylinder interposed transversely in the line 17, the piston 18 being connected by a suitable link with the brake pedal 22. When the brake pedal is in its normal upper position wherein the brakes are disengaged, the passage 20 furnishes communication between the two portions of 17 extending oppositely from this cylinder. The transmission is provided with the usual interlocking means preventing movement of either of the members 38 or 40 unless the other one is moved to its transmission neutral position. In other words, when both the accelerator plunger and brake pedal are in their upper positions free communication between the intake manifold and a cylinder 24 is established through the connection 17.

The cylinder 24 contains a piston 26 connected by a suitable link with the clutch pedal 28 which is so arranged that in its uppermost position engagement is effected between the movable and fixed parts 30 and 32 of the clutch mechanism, the former part being keyed to a shaft 36 and the latter part being secured to the engine crank shaft 34. The usual clutch spring 35 serves to effect engagement of the clutch except when the clutch pedal 28 is moved downwardly either by the piston 26 or by the action of the driver's foot. The clutch mechanism has been conventionally illustrated. It will be understood, of course, that a more refined type of clutch would be similarly controlled.

In the case of both the piston valves 14 and 18 the portions of line 17 away from the engine are enlarged as indicated at 78 and 82. The opposite sides of the cylinders are provided with passages 80 and 84 communicating with the atmosphere. As a consequence, if a vacuum exists in the line 17 and the cylinder 24, depression of either the accelerator plunger or the brake pedal will effect communication between the cylinder 24 and the atmosphere to break the vacuum therein. This action will be referred to later.

The change speed mechanism is conventionally illustrated as consisting of a gear box 41 in which slide two members 38 and 40 which in their usual forms are provided with forks engaging collars of gears or toothed clutches. A lever 42 mounted for universal movement by a ball and socket arrangement may be manipulated to any one of four positions to secure low, intermediate, high and reverse speeds. A conventional arrangement is illustrated in which movement of the upper end of lever 42 to the left in Figure 3 effects a selection of the low and reverse gear operating member 40, while movement to the right is used to effect a selection of the intermediate and high gear operating member 38. A spring 76 normally urges the lever so that its upper end moves toward the right, that is, so that it is normally in position to produce a shift of gears into intermediate, or high, when moved forwardly or rearwardly from neutral position.

The rod 38 which controls the gears for effecting intermediate or high gear changes has a pin and slot engagement with the end of pivoted lever 44, the lower end of which has a pin and slot connection with a piston rod 46 connecting pistons 48 and 50 slidable in cylinders 52 and 54 respectively. These cylinders are respectively connected through tubes 56 and 58 with a valve casing indicated at 60 which is connected by a tube 62 to the line 17 at a point between the valves 14 and 18. Between the connection of tube 62 and the inlet of tube 56 to the valve 60 there is interposed a piston valve 64. Similarly, a piston valve 66 is interposed between the connections of tubes 58 and 62. These pistons 64 and 66 are connected through suitable links and levers to buttons 68 and 70 projecting through the floor and urged upwardly by suitable springs 69 and 71 respectively. By this arrangement the tubes 56 and 58 are normally maintained in communication with the atmosphere through the passages 72 and 74. If either of the buttons 68 or 70 is depressed, however, the corresponding piston will move downwardly cutting off communication with the atmosphere and placing the tube 62 in communication with either of the tubes 56 or 58.

Assuming the change speed gearing in neutral and the engine idling it will be noted that cylinder 24 is in communication with the intake manifold and accordingly there will be produced therein a partial vacuum acting to draw the piston 26 downwardly and disconnect the clutch 30. Accordingly the engine will be running entirely free from connection with the rear wheels, that is, the transmission shaft 43 will be stationary. Now assuming it is desired to start in low gear, the lever 42 will be manually manipulated to mesh the proper gears, this being possible without any foot manipulation since the clutch is already disconnected. If the operator now steps upon the accelerator button 11 the connection between the intake manifold and cylinder 24 will be interrupted while at the same time communication will be established between 84 and 82 through 16 so that atmosphere is admitted below the piston 26, the piston will move upwardly, the clutch pedal 28 will move rearwardly and the clutch will be engaged, thus starting car forwardly. As soon as sufficient speed is attained in low gear the operator may lift his right foot from the button 11. Immediately the vacuum connection is again established and piston 26 will be moved downwardly disconnecting the clutch. By immediately depressing the button 68 vacuum connection is established between 62 and 56 so that the piston 48 is moved to the right meshing the intermediate gearing as soon as the shift lever 42 is moved by hand from low speed position to neutral position since as soon as it does move to neutral position the spring 76 will cause its lower end to move to the left so as to engage the rod 38. If the accelerator button is again depressed the clutch is again engaged and speed may be gained in the intermediate gear.

In order to now shift into high, it is merely necessary to raise the foot from the button 11 and depress button 70 whereupon the piston 50 will be moved to the left as viewed in Fig. 1 with an automatic shift into high gear. Following this shift the accelerator button 11 may be depressed as desired for the attainment of the required running speed. Whenever the accelerator button is depressed the clutch 30 is engaged so that the engine will drive the shaft 43 and the rear wheels. On the other hand whenever the accelerator button is released the clutch will be automatically disengaged providing "free-wheeling." In such case a car may be moving under its own momentum or by reason of a downgrade in the road while the engine is idling.

If it is now desired to shift from high to intermediate gear as may be necessary if a steep down or up grade is encountered, or if it is desired to slow-down to a very low speed in traffic, it is only necessary for the operator to release button 11 and depress button 68 whereupon shift from high into intermediate will automatically take place. By a later depression of button 70 a reverse change from intermediate to high will take place, all without manipulation of the gear shift lever 42.

It is to be noted that in the above description in connection with the starting of the car the lever 42 was used only for shifting into low and from low into neutral, the change from intermediate to high or high to intermediate taking place merely by the depression of one or the other of buttons 68 or 70 while the button 11 is released. Since all three of these buttons are designed to be manipulated by the right foot it follows they would not be simultaneously depressed. In view of the fact that in most modern cars the drivers do not use low gear for starting except on grades, it will be clear that the gear shift lever 42 would be very seldom used, the shift of gears being semi-automatic inasmuch as the depression of the buttons 68 and 70 may be very readily effected.

About the only time when free wheeling is not desired is when the braking power effected by the engine compression is desired in going downgrade. Whenever this occurs it is natural for the operator to, at least partially, depress the brake pedal even though depression may not be so far as to cause application of the brakes. Provision is accordingly made to cause engagement of the clutch whenever the brake pedal is slightly depressed to such an extent that the brakes are scarcely, if at all, engaged.

The piston 18 acting similarly to the piston 14 will break the vacuum connection to cylinder 24 and furnish communication between 24 and the atmosphere to produce engagement of the clutch under these conditions. If a very moderate slope is encountered where it is merely necessary to utilize the braking effect of the engine the brake lever may be very slightly depressed. If greater braking effort is necessary further effort will cause the application of the conventional brakes.

It is to be noted that the arrangement is such that manipulation of the clutch and shifting of gears may be effected in the conventional fashion if the operator so desires.

It will be clear that numerous modifications, particularly in details, may be made without departing from the invention, as defined by the following claims.

What I claim and desire to protect by Letters Patent is:

1. In combination with an internal combustion engine having a throttle controlled intake manifold, driven mechanism, change speed gearing between the engine and driven mechanism, a clutch between the engine and change speed gearing, vacuum operated means connected to the intake manifold for automatically shifting the change speed gearing to certain positions, a manually operable lever for shifting the change speed gearing independently of the vacuum operated means to positions in addition to those reached automatically, and yieldable means biasing the manually operable lever toward a certain position.

2. In combination with a prime mover, a driven mechanism, a variable speed transmission between the prime mover and the driven mechanism, a pneumatic mechanism operable from the prime mover, and adapted to automatically shift the variable speed transmission, a manually operable lever for controlling the operation of the variable speed transmission independently of the pneumatic mechanism to effect changes in addition to those effected automatically, and yieldable means biasing the manually operable lever toward a certain position.

3. In combination with a prime mover, driven mechanism, change speed gearing between the prime mover and driven mechanism, a clutch between the prime mover and change speed gearing, power operated means for automatically shifting the change speed gearing to certain positions, a manually operable lever for shifting the change speed gearing independently of the power operated means to positions in addition to those reached automatically, and yieldable means biasing the manually operable lever toward a certain position.

4. In combination with a prime mover, driven mechanism, change speed gearing between the prime mover and driven mechanism, a clutch between the prime mover and change speed gearing, power operated means for automatically shifting the change speed gearing to certain positions, a manually operable lever for shifting the change speed gearing independently of the power operated means to positions in addition to those reached automatically, and yieldable means biasing the manually operable lever toward a certain position.

5. In combination with a prime mover, a driven mechanism, a variable speed transmission between the prime mover and the driven mechanism, a pneumatic mechanism operable from the prime mover and adapted to automatically shift the variable speed transmission, and a manually operable lever for controlling the operation of the variable speed transmission, said lever being moved to a certain position prior to the operation of the transmission by the pneumatic mechanism, and being movable to other positions to manually control the meshing of the gears to establish the transmission in any one of a plurality of desired gear ratios.

6. In an automotive vehicle provided with a change speed transmission having a low and reverse gear shifter member and an intermediate and high gear shifter member, power operated means for automatically shifting the transmission to either intermediate gear or high gear, a manually operable member mounted within easy reach of the driver and movable to a certain position prior to the operation of the transmission by the power means, and force transmitting means for interconnecting said member with the low and reverse gear shifter member whereby said latter member may be actuated by the physical effort of the driver to establish the transmission in either low gear or reverse gear.

JOHN H. STORTZ.